United States Patent [19]

Matsuo et al.

[11] Patent Number: 4,565,002
[45] Date of Patent: Jan. 21, 1986

[54] METHOD OF FORMING A SEPARATOR FOR A CYLINDRICAL BATTERY

[75] Inventors: Setsuo Matsuo; Noboru Nakanome, both of Sumoto; Koji Nishishita, Hyogo, all of Japan

[73] Assignee: Sanyo Electric Co., Ltd., Osaka, Japan

[21] Appl. No.: 588,543

[22] Filed: Mar. 12, 1984

[30] Foreign Application Priority Data

Mar. 16, 1983 [JP] Japan .................................. 58-43918
Jun. 16, 1983 [JP] Japan ................................ 58-108590
Jul. 6, 1983 [JP] Japan ................................ 58-123905
Jul. 8, 1983 [JP] Japan ............................ 58-106964[U]

[51] Int. Cl.⁴ ............................................. H01M 6/00
[52] U.S. Cl. .................................................. 29/623.4
[58] Field of Search ............... 29/623.4, 623.1–623.3, 29/623.5, 729, 730; 429/133, 140, 141, 136–139

[56] References Cited

U.S. PATENT DOCUMENTS

| 3,429,752 | 2/1969 | Sundberg | 136/147 |
| 3,450,566 | 6/1969 | Solomon et al. | 429/136 |
| 3,615,834 | 10/1971 | Sundberg | 29/623.4 |
| 3,985,573 | 10/1976 | Johnson et al. | 429/133 |
| 4,074,023 | 2/1978 | Urry | 429/133 X |
| 4,078,123 | 3/1978 | Costenoble | 429/141 |
| 4,080,727 | 3/1978 | Stolle et al. | 29/623.4 |
| 4,080,732 | 3/1978 | Eberle | 29/623.4 X |

Primary Examiner—Charles F. LeFevour
Attorney, Agent, or Firm—Darby & Darby

[57] ABSTRACT

A method of forming a separator for a cylindrical battery comprising: disposing a cylindrical or columnar electrode on a metal mold having a circular groove through one or more layers belt-shaped separator being wider than the length of said electrode, pushing said electrode into said groove to contact said separator to a part of the periphery of said electrode, pressing residual both ends of said separator along the residual periphery of said electrode, and continuously or discontinuously welding an overlapped portion of both ends of said separator.

5 Claims, 19 Drawing Figures

METHOD OF FORMING A SEPARATOR FOR A CYLINDRICAL BATTERY

BACKGROUND OF THE INVENTION

1. Field of the invention

This invention relates to a method of forming a separator for a cylindrical battery (for example, organic electrolyte batteries, alkaline zinc batteries, and the like) which includes cylindrical or columnar positive and negative electrodes disposed concentrically through a separator.

2. Description of the prior art

In batteries with such a structure described above, separators, which are previously molded so as to form a cylindrical and closed-ended structure, have been generally employed.

In order to save a step for previously forming the above cylindrical separator, a method of making a battery has been recently proposed which includes winding a separator several times over around an electrode located at a center of the battery, and welding a residual portion of the lower end of the separator or welding after twisting it, thereby closing the separator (see Japanese published examined patent application No. 41690/1979).

On the contact condition between the electrode and the separator in this method, the separator is only wound around the electrode, and therefore it is not sufficiently contacted to the electrode to cause a gap therebetween. Consequently, there are provided such problems that since the possessory volume of the separator in the battery is increased, the volume efficiency within the battery is lowered, and that as the distance between electrodes becomes large, the internal resistance of the battery is increased to lower the battery performances.

SUMMARY OF THE INVENTION

The present invention has been made in order to overcome the described problems, which provides a method of forming a separator comprising the steps of: disposing a cylindrical or columnar electrode on a metal mold having a circular groove through one or more layers belt-shaped separator being wider than a length of the electrode, pushing the electrode into the groove to contact the separator to a part of the periphery of the electrode, pressing both residual ends of the separator along the residual periphery of the electrode, and continuously or discontinuously welding an overlapped portion of both ends of the separator to one another. According to the present invention, since the electrode and the separator are maintained under a highly contacted condition, the possessory volume of the separator will be reduced and the distance between positive and negative electrodes will be decreased, thereby overcoming problems of conventional batteries. This method can also be automated.

Further, the term of "more layers belt-shaped separator" as used in the above is intended to mean two or three separator sheets. The present invention includes a method of making such separator which comprises superimposing a plurality of belt-shaped separator to one another, and welding the superimposed separator sheets at both ends of the center line or continuously or discontinuously welding the superimposed separator sheets to one another along the center line. When the separator sheets obtained by this method are used, respective separator sheets will not be shifted and unwanted creases will not be caused with respect to the contact with the electrode.

Furthermore, the present invention includes to use an electrode having a jointed recessed portion. In the use of such electrode, a separator is formed by disposing an overlapped portion of both ends of a belt-shaped separator on a jointed recessed portion of the electrode, and continuously or discontinuously welding an overlapped portion of the separator. According to this method, the obstruction of reaction in the electrode caused near the overlapped portion of both ends of the separator can greatly lowered. In addition, since an overlapped portion of separator is disposed on the jointed recessed portion of the electrode, the separator can be maintained in the approximately circle configuration even if the electrode has a jointed recessed portion, therefore the distance between the electrode wound by the separator and another electrode located through the separator will be made uniform. Consequently, the reaction efficiency of the battery can be increased.

Still further, the present invention includes a method of forming a separator which comprises contacting a belt-shaped separator around a electrode, continuously or discontinuously welding an overlapped portion of both ends of the separator, clamping and closing one end of the separator extending from one end of the electrode by at least a pair of jigs, and welding the closed portion of the separator. This method can completely insure the sealing of the separator end through automation.

DETAILED DESCRIPTION OF THE PREFERRED EMBODIMENTS

A method of forming a separator for a battery according to the present invention will now be described by using an organic electrolyte battery.

In this battery, a positive material containing manganese dioxide used as a positive active material (for example, manganese dioxide/graphite as a conductive material/polytetrafluoroethylene as a binder, 85:10:5 by weight part) is molded to make a cylindrical positive electrode, and a cylindrical negative electrode of light metal such as lithium, sodium, and the like is inserted into the hollow portion of the cylindrical positive electrode through a separator (for example, non-woven fabrics of polypropylene or polyethylene fibers, porous films of polypropylene or polyethylene, and the like may be used, and the same materials are not always required to be employed when the separator is made of a plurality of sheets). As an example of the electrolyte, a solution prepared by dissolving 1 mol concentration of lithium perchlorate in a mixed solvent of propylene carbonate and dimethoxyethane with equal volumes can be used.

EXAMPLE 1

(referring to FIGS. 1 to 6)

Figure 1:
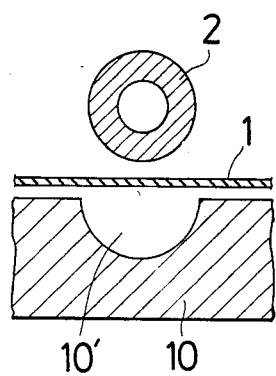
FIGS. 1 to 4 are schematic sectional views showing one embodiment of a method of forming a separator using a metal mold according to the present invention.
Figure 2:
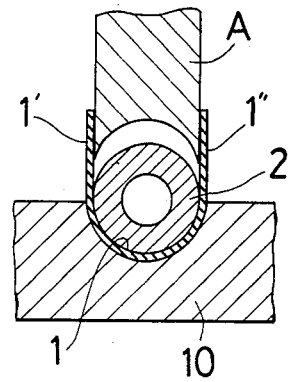
Figure 3:
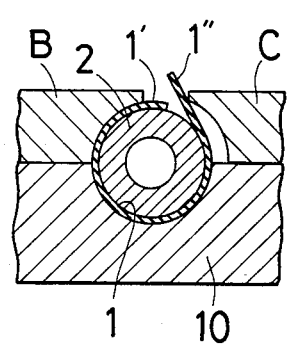
Figure 4:
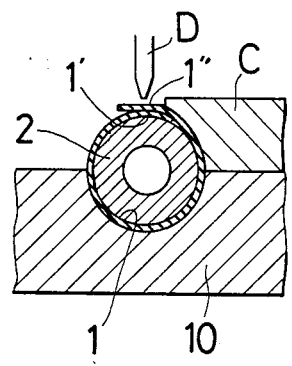
Figure 5:
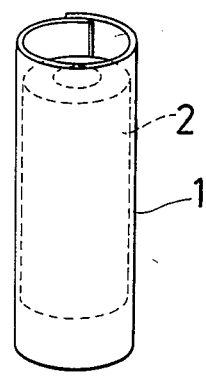
FIGS. 5, 10 and 13 are schematic perspective views of lithium negative electrode with an integrally molded separator formed by a method of the present invention.
Figure 6:
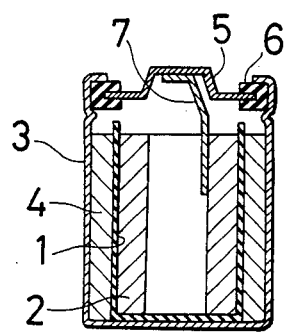
FIGS. 6 and 11 are schematic vertical-sectional view of an organic electrolyte battery using a separator molded by a method of the present invention.

As shown in FIG. 1, a metal mold (10) having a circular groove (10')(a semicircular groove in the example) is prepared, on which a cylindrical lithium negative electrode (2) is first placed through a separator (1) of polypropylene non-woven fabric which is wider than the length of the negative electrode (2). And as shown in FIG. 2, if the lithium negative electrode (2) is pushed into the groove (10') of the metal mold (10) by using a first pressing member (A), the separator (1) is then deformed to U-shaped structure and is closely contacted to the lower periphery of the lithium negative electrode (2). Thereafter, as shown in FIG. 3, after one end portion (1') of the separator (1) is pressed and contacted to the periphery of the negative electrode (2) by means of a second pressing member (B), the other portion (1") is pressed and contacted to the periphery of the electrode (2) by means of a third pressing member (C). And as shown in FIG. 4, the overlapped portion of the separator is continuously or discontinuously welded by using a ultrasonic welding machine (D) to provide a lithium negative electrode (2) integrally molded with the separator (1) as shown in FIG. 5. In the case of use, the residual portion of the separator extending from one end of the lithium negative electrode (2) is gathered and sealed by thermal welding or the like. FIG. 6 shows a cylindrical type organic electrolyte battery which employs the lithium negative electrode (2) integrally molded with the separator (1), wherein (3) is a casing serving as a positive terminal and includes a cylindrical positive electrode (4) of manganese dioxide in its inner surface, (5) is a sealing cap serving as a negative terminal which is insulated from the casing (3) through an insulating packing (6), and one end of a negative collector which extends from the negative electrode (2) is spot welded to the inner bottom surface of the sealing cap (5) to electrically connect the negative electrode (2) to the negative terminal of the sealing cap (5).

According to the above molding method, the separator will be integrally molded with the electrode while applying the pressure to the electrode, thereby maintaining the electrode and the separator under the highly contacted condition. Therefore, the gap between the electrode and the separator will be lowered to improve the battery performances by increasing the internal volume efficiency of the battery and reducing the internal resistance. When the soft metal such as lithium is used as the electrode, the close contact between the separator and the electrode will be particularly excellent.

EXAMPLE 2

(referring to FIGS. 7 to 11)

Figure 7:
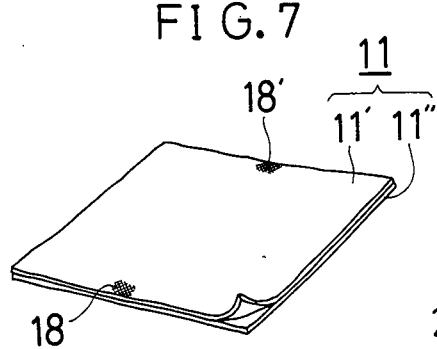
FIGS. 7 to 9 are perspective views and schematic sectional views showing one embodiment of a method for molding superimposed two separator sheets according to the present invention.
Figure 8:
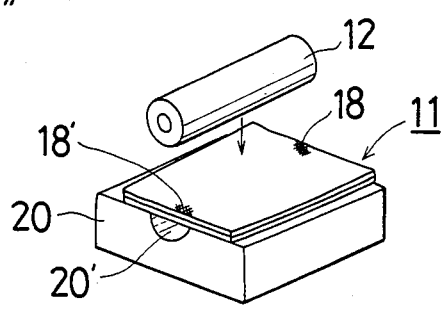
Figure 9:
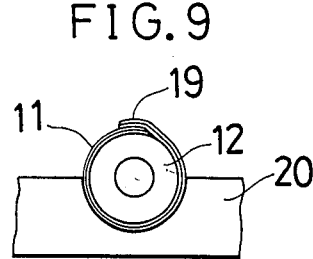
Figure 10:
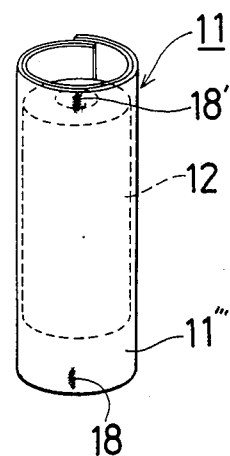

Two separator sheets (11') and (11") of polypropylene non-woven fabric, cut into a desired size as shown in FIG. 7, are superimposed to each other, and the separator sheets are welded at both ends (18) and (18') along the approximate center line by using ultrasonic welding or thermal welding, thereby providing a double-layer separator (11). The welding may be continuously or discontinuously carried out along the approximate center line. Thereafter, as shown in FIG. 8 the double-layer separator (11) is placed on a metal mold (20) having a semicircular groove (20'), and a cylindrical lithium electrode (12) is pushed and pressed into the semicircular groove of the metal mold (20) from the upper part of the separator (11). At this time, the double-layer separator (11) is disposed on the metal mold (20) in such a manner that the center line connecting a pair of welding portions (18) and (18') to each other is made parallel relative to the electrode (12). Thereafter, as shown in FIG. 9 the double-layer separator (11) is pressed and wound around the cylindrical type lithium electrode (12) and the overlapped portion (19) is continuously or discontinuously welded by ultrasonic or thermal welding, thereby integrally attaching the double-layer separator (11) to the periphery of the lithium negative electrode (12) as shown in FIG. 10.

Thereafter, the lower residual portion (11''') of the double-layer separator (11) is sealed by conventional techniques, for example, by welding after twisting or gathering it.

Figure 11:
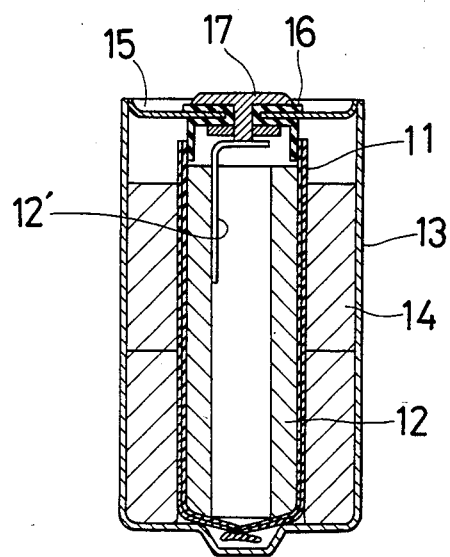

FIG. 11 shows a vertical sectional view of a cylindrical type organic electrolyte battery including the separator (11) molded by the method described above. In FIG. 11, (13) is a battery casing used as a positive terminal, in which a cylindrical positive electrode (14) of manganese dioxide is disposed. (15) is a metal cap covering an opening of the battery casing (13). A negative terminal pin (17) is fixed to the central perforation of the metal cap (15) through an insulating member (16), and one end of a lead plate (12') led from the lithium negative electrode (12) is secured to the lower surface of the pin (17).

According to this method, respective separator sheets will be easily contacted to the surface of the electrode without unwanted position shift. Further, since the periphery of the separator is freely maintained except both ends of the center line, unwanted creases will not be generated when the separator is contacted to the electrode surface.

EXAMPLE 3

Figure 12:
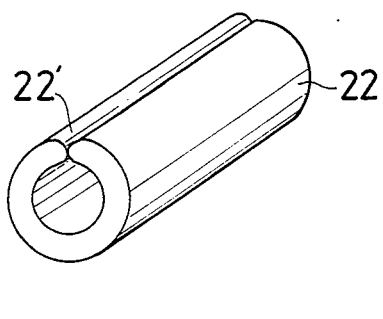
FIG. 12 is a perspective view of a cylindrical electrode having a jointed recessed portion used for the present invention.
Figure 13:
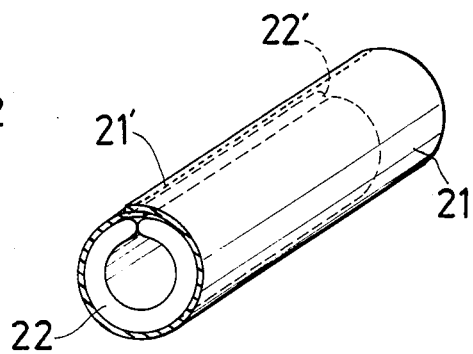

(referring to FIGS. 12 and 13)

In Examples 1 and 2, a cylindrical negative electrode, around which a separator is to be wound, may often include a jointed recessed portion in a longitudinal direction of its periphery. That is, an electrode (22) has a jointed recessed portion (22') in a longitudinal direction as shown in FIG. 12. In this case the overlapped portion (21') of the separator was arranged on the jointed recessed portion (22') and was continuously or discontinuously welded as shown in FIG. 13.

As has been described above, according to such a method, since the overlapped portion (21') of the separator is positioned on the jointed recessed portion (22'), the following advantages will be obtained. That is, since the overlapped portion (21') of the separator is low in permeability of the electrolyte, reaction efficiency of the electrode portion under the overlapped portion (21') will be lowered if the overlapped portion (21') is located on the surface of the electrode except the recessed portion (22'). However, as the recessed portion (22') is low in the amount of active material, the reduction of the reaction efficiency in the electrode may be suppressed even if the overlapped portion is disposed on the recessed portion. Further, the whole periphery of the negative electrode is kept at an approximately uniform distance with respect to a positive electrode opposed to the negative electrode through the separator, thereby increasing the reaction efficiency of both electrodes.

EXAMPLE 4

(referring to FIGS. 14 to 19)

Figure 14:
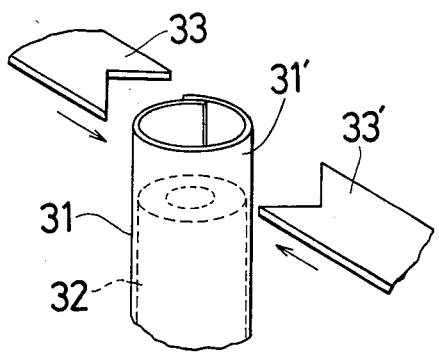
FIGS. 14 to 19 are perspective views showing two embodiments of a method for sealing one end portion of a separator by using at least a pair of jigs.
Figure 15:
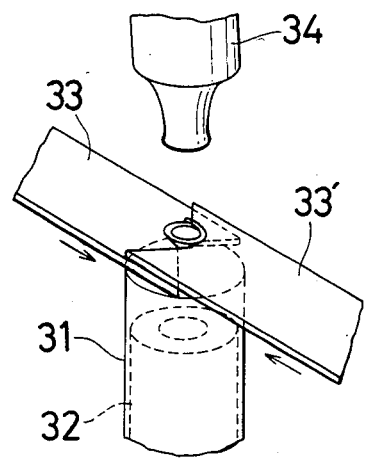
Figure 16:
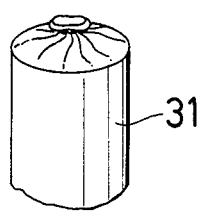

A pair of plate-shaped jigs (33) and (33') having V-shaped notch at the edge thereof are arranged face to face with an end portion (31') of a separator (31) wound around a cylindrical type negative electrode (32) as shown in FIG. 14. The pair of jigs (33) and (33') are then moved in directions of arrows, so that the end portion (31') of the separator will be clamped and closed as shown in FIG. 15. Thereafter, the closed portion of the separator is welded by applying a ultrasonic horn (34) while holding it by the pair of jigs (33) and (33'), thereby sealing the closed portion as shown in FIG. 16.

Figure 17:
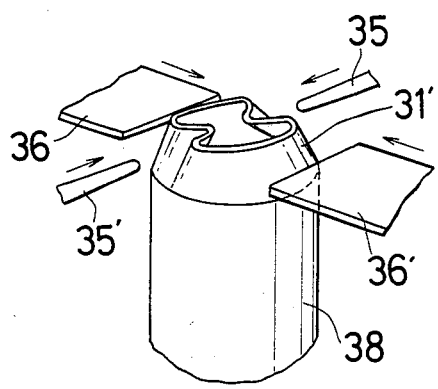
Figure 18:
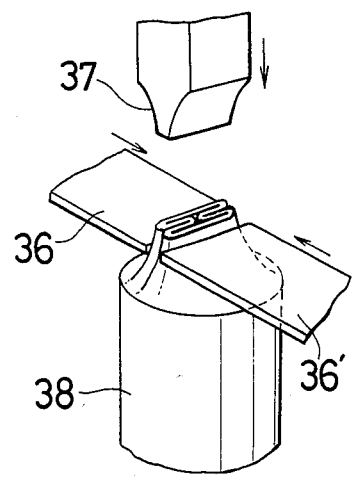
Figure 19:
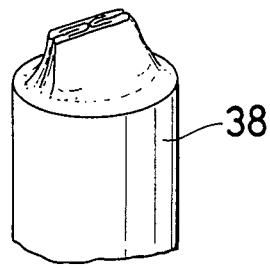

FIGS. 17 to 19 show another sealing technique. In FIG. 17, after a pair of rod-shaped jigs (35) and (35') was applied to an end portion (31") of a separator from opposite positions, these rod-shaped jigs (35) and (35') are moved back, and a pair of plate-shaped jigs (36) and (36') are moved directions of arrows from a position intersecting with the rod-shaped jigs (35) and (35'), thereby closing the end portion (31") of the separator. Thereafter, a ultrasonic horn (37) is applied to the closed portion while holding it by the pair of jigs (36) and (36') as shown in FIG. 18, thereby welding it. Consequently, the closed portion is sealed as shown in FIG. 19.

The sealing technique described above has such advantage that the automation is easily accomplished, because the pair of jigs include a function for closing the end portion of the separator and a function for holding the closed portion during welding.

What is claimed is:

1. A method for forming a separator for a cylindrical battery having a cylindrical electrode comprising the steps of:
   disposing a belt-shaped separator having at least one layer on a metal mold having a circular groove therein, said separator having a length longer than a length of said electrode;
   disposing said electrode over said groove;
   pushing said electrode into said groove to contact a first portion of said electrode to a first portion of said separator;
   pressing remaining portions of said separator not contacting said electrode to remaining portions of said electrode not contacted by said first portion of said separator to contact said remaining portions of said electrode against said remaining portions of said separator so that regions of said remaining portion of said separator are overlapping; and
   welding said overlapping regions of said separator at the region of overlap.

2. The method according to claim 1, wherein the more layers belt-shaped separator is comprised of a plurality of separator sheets, which is prepared by superimposing a plurality of separator sheets, welding the superimposed separator sheets on an approximate center line.

3. The method according to claim 1, wherein the electrode is one having a jointed recessed portion, the welding of the overlapped portion of the separator being conducted at the position on the jointed recessed portion.

4. The method according to claim 1, wherein after welding the overlapped portion of the separator, one end of the separator extending from one end of the electrode is clamped and closed by at least a pair of jigs, and then the closed portion of the separator is sealed by welding.

5. The method according to claim 1, wherein said belt-shaped separator is comprised of a plurality of separator sheets, which are prepared by superimposing said plurality of separator sheets, and welding said superimposed separation sheets at ends thereof of a centerline of said sheets.

* * * * *